Patented Dec. 4, 1945

2,390,079

UNITED STATES PATENT OFFICE 2,390,079

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 26, 1944,
Serial No. 542,234

6 Claims. (Cl. 252—341)

This invention relates to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or brines. Controlled emulsion and subsequent demulsification, under the conditions just mentioned, is of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure.

The new material herein described, that is used as the demulsifier of our process, consists of subresinous reaction products derived by reaction between (A) A polybasic carboxy acid compound characterized by (a) the presence of at least one free carboxyl radical or its obvious equivalent; (b) the absence of any hydroxy fatty acid radical as a substituent for an acidic hydrogen atom of any carboxyl radical; and (c) the absence of any polyhydric alcohol radical as a substituent for an acidic hydrogen atom of any carboxyl radical, if said polyhydric alcohol radical is also united with one or more monobasic carboxy detergent-forming acid radicals; and (B) A basic esterified aminoalcohol of the formula:

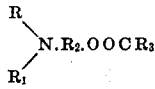

in which R is a monovalent radical free from ether linkages and having at least 8 carbon atoms and not more than 32 carbon atoms, and being a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages, and being a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene, and methylbutylene; and $R_1$ is a monovalent radical and a member of the class consisting of aliphatic hydrocarbon radicals, alicyclic hydrocarbon radicals, and aralkyl hydrocarbon radicals having not more than 32 carbon atoms and the monovalent radical $HOR_2$, wherein $R_2$ has its prior significance; $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

Monobasic carboxy detergent-forming acids contain at least 8 and not more than 32 carbon atoms. They are exemplified by higher fatty acids, naphthenic acids, resinic acids, oxidized petroleum acids, and the like. They combine with alkali to form soap or soap-like materials. This expression "monobasic carboxy detergent-forming acids" is frequently used in the demulsification art in this sense.

The amino nitrogen atom must be free from directly linked acyl radicals or aryl radicals. Stated another way, the nitrogen atom must be a basic amino nitrogen atom. See "Textbook of Organic Chemistry," Richter, 2nd edition, p. 253.

Amines of the kind contemplated and used as primary reactants in producing the compounds herein described, are produced in various manners. They may be produced from naphthenic acids, resin acids, fatty acids, or oxidized petroleum acids or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted with ammonia or a primary or secondary amine to give the amines of the type herein contemplated. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid, or some other hydroxy acid, such as hydroxystearic acid, such amines include a hydroxylated hydrocarbon radical.

In actual practice amines of the kind herein contemplated as reactants, can be obtained in various ways. Reference is made to a number of patents, which disclose or describe such amines, or the method of manufacturing the same. In some cases obvious modifications will be required to produce amines of the kind herein contemplated; but such modifications would be evident to a skilled chemist without further discussion. See the following patents: U. S. Patent Nos. 1,961,469, Bertsch, Mar. 20, 1934; 2,006,058, Olin, June 25, 1935; 2,033,866, Schrauth, Mar. 10, 1936; 2,074,380, Flett, Mar. 23, 1937; 2,075,825, Nafash, Apr. 6, 1937; 2,078,922, Arnold, May 4, 1937; 2,091,105, Piggott, Aug. 24, 1937; 2,108,147, Speer, Feb. 15, 1938; 2,110,199, Carothers, Mar. 8, 1938; 2,132,902, Lenher, Oct. 11, 1938; and 2,178,522, Ralston, Oct. 31, 1938; British Patent Nos. 359,001, Johnson, on behalf of I. G. Farbenindustrie, A.-G., 1932; and 358,114, Carpmael, on behalf of I. G. Farbenindustrie, A.-G., 1932. Also note: Industrial & Engineering Chemistry, Industrial Edition, volume 32, No. 4 (1940), p. 486.

In view of what has been said, it will be noted that the group introduced into the amine and derived at least hypothetically from an acid, is really the carbon atom chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom or a small number of hydrogen atoms have been replaced by the hydroxyl radical; for instance, the hydroxy hydrocarbon radical which would be supplied by ricinoleic acid, hydroxystearic acid, dihydroxystearic acid or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially nonfunctional, in that they are not necessarily relied upon to supply points of chemical activity, as far as the herein contemplated compounds are concerned. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon," is intended to include the hydroxy-hydrocarbon type of the kind in which the hydroxyl group does not materially reduce the hydrophobe character of the hydrocarbon group, as, for example, the group or radical which would be obtained from rinicoleic acid.

In addition to synthetic carboxy acids obtained by the oxidation of paraffins or the like, there is the somewhat analogous class obtained by treating carbon dioxide or carbon monoxide in the presence of hydrogen or an olefine, with steam, or by causing a metallic alkoxide or a halogenated hydrocarbon to react with chloroacetic acid, or with potassium cyanide, and saponifying the product thus obtained. Such products or mixtures thereof, having at least 8 and not more than 32 carbon atoms, and having at least one carboxy group or the equivalent thereof, are as suitable for use as the conventional detergent-forming monocarboxy acids, and another analogous class equally suitable, is the mixture of carboxylic acids obtained by the alkali treatment of alcohols of higher molecular weight formed in the catalytic hydrogenation of carbon monoxide. The synthetic carboxy acids so obtained can be converted into high molal amines by the same procedure as employed for the conversion of other carboxy acids.

The patents previously referred to, indicate a large number of suitable amines which are the type previously specified. For the sake of brevity, reference will be made only to certain primary amines. Obviously, secondary or tertiary amines could be derived from such primary amines by introducing alkyl groups having less than 8 carbon atoms, such as methyl, ethyl, propyl, butyl groups and the like; or one might introduce radicals in which the carbon atom chain was interrupted at least once by oxygen, as, for example, radicals derived by reacting an amine with compounds, such as $C_2H_5OC_2H_4Cl$ or $OHC_2H_4OC_2H_4Cl$. An aralkyl group, such as a benzyl group, might be introduced, or an alicyclic group, such as a cyclohexyl group.

The primary amines which may be used as such or converted into secondary amines include the following: Octadecenylamine; cetylamine; stearylamine; oleoamine; ricinoleoamine; amines derived from naphthenic acids; amines derived from octadecadiene 9, 11-acid-1; octadecylamine; amines derived from mixed unsaturated fatty acids such as soyabean fatty acids; cottonseed oil fatty acids; linseed oil fatty acids; heptadecylamine, hexadecylamine; dodecylamine; decylamine, etc.

Having obtained amines of the kind described, such amines are treated with an oxyalkylating agent, preferably ethylene oxide. Other oxyalkylating agents may be used. As typical examples of applicable compounds may be mentioned epichlorhydrin, glycid alcohol. ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

It is to be noted that the same oxyalkylation agent need not be employed throughout the entire oxyalkylation process. For instance, the secondary amine, dioctylamine might be reacted with one mole of ethylene oxide, and two moles of propylene oxide, and such compound might then be treated with one mole of glycid, and then with 2 or 4 moles of ethylene oxide. It would be equally feasible to use 2 moles of ethylene oxide, and then one mole of glycid. This same procedure could be applied just as effectively to primary amines. Its special significance is as follows: If a secondary amine indicated by

is treated with 2 moles of ethylene oxide to give

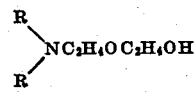

such product could then be treated with one mole of glycid to give a diol group, as follows:

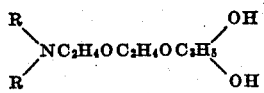

Such product meets the requirement that, after being reacted with a low molal monocarboxy acid, there is still present an available hydroxy radical for further reaction, as is required in the herein described procedure.

As will be indicated hereafter, the low molal acid which reacts with an alcoholic hydroxyl group, may also, in turn, contain a reactive hydroxyl radical, as in the instance of lactic acid or hydroxyacetic acid, or the like.

For instance, reference is made to U. S. Patent No. 2,174,762, dated October 3, 1939, to Schuette et al. Said patent is concerned with oxyethylation of amines to a degree sufficient to produce water solubility. In the present instance the number of recurring ether linkages in any single chain is preferably limited to 3, and water solubility may or may not occur. In other words, an oxyethylated high molal amine which is water-insoluble may serve as an intermediate reactant.

See also U. S. Patent No. 2,195,194, dated March 26, 1940, to Ulrich et al. As to methods which can be readily adapted for the oxyalkylation of high molal amines, as herein contemplated, see U. S. Patent No. 2,275,470, dated March 10, 1942, to Ruark, and U. S. Patent No. 2,337,004, dated December 14, 1943, to Schwoegler. For convenience, attention is momentarily directed to the formula previously presented, to wit:

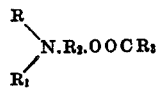

Since available low molal hydroxy acids are comparatively few, for instance, lactic acid, hydroxyacetic acid, etc., and since amines are derived from hydroxystearic acid, ricinoleic acid, etc., are not as readily available as other amines, it is obvious that in most instances, the hydroxyl radical is part of the radical $R_1$ or $R_2$.

$R_1$ can readily represent a hydroxyethyl radical, a hydroxypropyl radical, etc. $R_2$ can readily contain a hydroxyl radical available for esterification, if the compound is obtained by use of glycid or the like, all of which is illustrated by suitable formulas subsequently.

The following reactants are included purely by way of illustration, and the description is substantially that appearing in the indicated patents.

HIGH MOLAL AMINO-POLYGLYCOL

Example 1

1 molecular proportion of dodecylamine is caused to react with 2 molecular proportions of epichlorhydrin which are added to the reaction mixture in small portions, 2 molecular proportions of propylene oxide then being brought into reaction at zero degrees C., in the presence of 0.5 percent of sodium ethylate. The reaction can also be conducted conveniently, if suitable caution is employed, and at the same temperature or slightly higher temperature, by using glycid instead of the epichlorhydrin. This has the advantage that no hydrochloric acid is liberated to form a salt.

HIGH MOLAL AMINO-POLYGLYCOL

Example 2

1 molecular proportion of cetylamine is heated in an autoclave, under pressure, at about 150° C., with 4 molecular proportions of propylene oxide, and then with 2 molecular proportions of ethylene oxide. (See Examples 1 and 2 of aforementioned U. S. Patent No. 2,174,762.)

HIGH MOLAL AMINO-POLYGLYCOL

Example 3

A mixture of dicetyl- and dioctadecyl-ethanolamine polyethylene glycol is obtained by the action of 3 molecular proportions of ethylene oxide on about 1 molecular proportion of a technical mixture of dicetylamine and dioctadecylamine. (See Example 1 of aforementioned U. S. Patent No. 2,195,194.) Such product is then reacted further with 1 mole of glycid.

HIGH MOLAL AMINO-POLYGLYCOL

Example 4

A mixture of 150 parts of N-stearyl-B,B',B''-trihydroxy ter.-butylamine with 45 parts of ethylene oxide (2.65 molecular equivalents) is heated in a closed vessel by raising the temperature to 120° C. uniformly during 5 hours, and then keeping at this temperature until the internal pressure falls to zero. (See U. S. Patent No. 2,091,105, dated August 24, 1937, to Piggott.)

HIGH MOLAL AMINO-POLYGLYCOL

Example 5

1 pound mole of octadecylamine is reacted with 8 moles of ethylene oxide in the manner described under Example 1 in British Patent No. 380,851, to I. G. Farbenindustrie A.-G., dated July 29, 1932. Attention is also directed to said patent, insofar that it enumerates other high molal basic amines suitable for oxyalkylation.

Having obtained suitable monohydroxylated, or preferably, polyhydroxylated high molal amino-polyglycols, or the equivalent, of the kind previously described, such products are subjected to esterification with low molal carboxy acids having 7 carbon atoms or less, in such predetermined ratios that there is present at least one alcoholic hydroxyl for subsequent esterification reactions. Monohydroxylated compounds require the use of a hydroxylated low molal carboxy acid.

Some of such acids have been previously described in characterizing the acyl radical $R_3CO$. Additional examples of the hydroxylated type have been mentioned. Other suitable acids include furoic and unsaturated acids, such as acrylic, crotonic, tiglic, etc.

The esterification reactions are conducted in the usual manner. In such instances where there are two polyglycol radicals present, one may introduce a low molal acyl radical as a substituent for each terminal hydrogen atom. It is our preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent, such as an anhydride or other suitable derivative.

In the instance of acids having boiling points in excess of 175° C., for instance, normal caproic acid, it is our preference to add a stoichiometric equivalent and conduct the reaction until the amount of water eliminated is equal to, or almost equal to, the theoretical yield. Hydroxyacetic acid may be employed in the same manner.

In the following examples, reference is made to the use of certain low molal acids. Actually, the esterification reaction can be accelerated by use of the anhydride, i. e., using one mole of the anhydride to replace 2 moles of acid, except in such instance where there is no objection to excess acid, and where the excess acid or excess anhydride is subsequently removed, one may replace each mole of acid by one mole of anhydride. Particular reference is concerned with the use of acetic anhydride, propionic anhydride, n-butyric anhydride, isobutyric anhydride, n-valeric anhydride, n-caproic anhydride, and particularly, the last five where the boiling points of the anhydrides vary from 169° to 242° C. When the corresponding acid is formed, such acid may serve as a reactant in the esterification reaction, or can be removed by vacuum distillation. Reference has been made to the acids only because they are more generally available, but where the acyl chloride is available, the anhydride can be obtained from the acyl chlorides and the salt, or by other suitable means.

It has been pointed out that the herein contemplated amines used as reactants are basic in character. Thus, the initial reaction between the amine and the low molal carboxy acid results in salt formation. The esterification reaction involves the elimination of water from the salt. However, the esterified amine herein contemplated is still basic in character and combines with acids, particularly, inorganic acids, to form salts. Reference to the amines includes the anhydro base, the hydrated base, i. e., the ammonium form, or any suitable salt, including salts of the various low molal carboxy acids herein contemplated as reactants.

Attention is again directed to the fact that there must be a hydroxyl radical left for subsequent reaction with phthalic anhydride or its equivalent. If all hydroxyl radicals attached to the amino compound are eliminated, then the low molal acid must contain a hydroxyl group. A mixture of low molal acids, such as caproic and hydroxyacetic, may be used.

Hydroxylated Monocarboxy Ester of High Molal Amino-polyglycol

Example 1

1 pound mole of the product described under the heading "High molal amino-polyglycol, Example 3" is heated with 1 pound mole of isobutyric acid for approximately 8 to 18 hours at 150–154° C. The esterification is conducted by means of a hot condenser, that is, a condenser with the temperature regulated so as to be maintained at approximately 105° C. to 112.5° C. Such arrangement permits the elimination of much, if not all, of the water of esterification, but condenses and returns substantially all the unreacted butyric acid for further reaction. The progress of the esterification reaction can be followed by the use of a second trap condenser to retain and measure the water of reaction. Such water should be titrated for determination of any acid, which may have distilled over. At the end of such esterification period, the residual unreacted butyric acid is eliminated by distillation, and if preferred, vacuum distillation may be employed. The amount of base required for saponification of the ester, is, of course, a means of measuring the degree of esterification. Saponification re-liberates the butyric acid, both from the salt form and the ester form. The product shows excellent solubility in dilute acetic acid or dilute mineral acid. The product derived from commercial raw materials is an amber-colored, viscous or sticky compound at ordinary room temperature, and if contaminated by the presence of metallic iron or the like, may show even a darker appearance. The inorganic salt forms are more solid in nature than the anhydro base. Such appearance is typical of the entire class of intermediate materials of the type herein described.

Hydroxylated Monocarboxy Ester of High Molal Amino-polyglycol

Example 2

The high molal amino-polyglycol described under the heading of Example 1, is substituted for the high molal amino-polyglycol used in the preceding example.

Hydroxylated Monocarboxy Ester of High Molal Amino-polyglycol

Example 3

The same procedure is followed as in the preceding example, except that a product of the kind described under the heading "High molal amino-polyglycol, Example 2" is substituted for the amino-polyglycol employed in the previous example.

Hydroxylated Monocarboxy Ester of High Molal Amino-polyglycol

Example 4

Esterification is conducted by means of an acid having a substantially higher boiling point, such as normal caproic acid. One may use more than one mole of acid, provided there are present at least 3 hydroxyl radicals per mole of amino-polyglycol. The temperature of esterification is approximately 175°–195° C., and the condenser employed is a cold condenser with suitable arrangement to trap the water of esterification as formed, and also return any unreacted acid for further reaction. (Such arrangement is suitable where the acid is volatile and water-insoluble.) There is no difficulty in regard to the loss of the low molal acid, because, although it is volatile at the indicated temperature, it is readily condensable. Thus, as specific procedure illustrating the present example, one may use 1 mole of amino-polyglycol, Example 3, preceding, and 1 mole of caproic acid.

Hydroxylated Monocarboxy Ester of High Molal Amino-polyglycol

Example 5

The same procedure is employed as in the previous example, except that anhydrous hydroxyacetic acid is employed instead of caproic acid.

Previous reference has been made to high molal amino-polyglycols as reactants, for the reason that it is our preference to employ products in which there is at least one ether linkage obtained by the use of 2 or more moles of ethylene oxide per amino hydrogen atom. If desired, however, one may employ a single mole of the oxyethylating agent, such as ethylene oxide, for each available amino hydrogen atom. In such event the product obtained is not a polyglycol, but an aminoalcohol, insofar that there is a single alkylene radical present and no ether linkage. Such type of reactant may be employed in the present instance, if desired. Regardless of what type of reactant is employed, the final product is invariably soluble in or produces a colloidal salt in dilute acetic acid or dilute mineral acid. Completeness of reaction can be checked in each instance in the manner previously indicated.

In the case of hydroxyacetic acid, one may use a distinctly higher temperature without volatilization of the acid than in the instances where caproic acid is employed. For instance, the esterification involving hydroxyacetic acid may employ a temperature as high as 215° C.

Many of the preceding examples will be found to be soluble in water, even in the absence of acid. Some of the products are soluble in or produce a turbid sol or suspension in gasoline or benzene.

Previous reference has been made to the use of the anhydride as an acylating agent instead of the free acid. Probably salt formation is eliminated until esterification begins with liberation of a molecule of acid for each molecule of anhydride added. The liberated acid acts, of course, as if it had been added at the beginning of the reaction, and additionally presents a modification, in that water is not eliminated, unless esterification takes place by virtue of the free acid. If, however, the entire esterification reaction involves only the anhydride and no acid, water would not be liberated. Thus, the measurement of the condensed water, if any, under such circumstances, is not necessarily an index of esterification. Other procedure must be used, although unfortunately, no method of measurement is available which is relatively quick and absolutely satisfactory to a precise and quantitative degree. If a salt is formed, titration with caustic soda or potash, converts the salt into the free base. The particular end point, using the usual indicators, is rather indefinite, and thus, the use of additional alkali to determine the saponification value, results in a determination of somewhat approximate value, due to such difficulties of analytical manipulation. The values obtained, however, even though only approximate, are perfectly satisfactory for the present purpose. Other suitable procedure but more laborious, involves the saponification of the product, followed by acidification with a non-volatile mineral acid, e. g., sulfuric acid, and distillation of the low molal carboxy acids which were originally combined in ester form, followed by the usual volumetric procedure in correlation to the original sample.

The following reactions illustrate the formula of the high molal aminoalcohols and amino-polyglycols, and also their esterification products, without reference to the formation of the hydrated base or of a salt from the anhydro base. In the subsequent structural illustrations where $R_1$ appears, it is assumed, for convenience, that $R_1$, in such instance as illustrated, does not include a hydroxyl radical. Oxyalkylation, under such circumstances, must, of necessity, involve the amino hydrogen atom. Actually, it would not matter if the radical indicated by $R_1$ does contain a hydroxyl radical, for the reason that the linkage involving a hydrogen atom and an amino nitrogen atom, as contemplated in the herein described reactants, appears to be more susceptible to oxyalkylation than the hydrogen-oxygen linkage of the hydroxyl group. After the first mole of oxyalkylating agent is introduced into the amino-hydrogen position, whether it be ethylene oxide or glycid, the resulting radical is the equivalent of $R_1$ in such instances where $R_1$ does contain an alcoholic hydroxyl group. It would not matter if the next mole of oxyalkylating agent attacked the hydroxyl of $R_1$ or the hydroxyl of the alcoholic group which replaced the amino hydrogen atom. Stated in another way, if $R_1$ is a hydroxylated radical, then $R_2OH$ and $R_1$ would be the equivalent of each other, and $R_3COOH$ in the resulting esterification reaction would combine as readily, in most instances, with the $R_1$ radical as with the $R_2OH$ radical. One must not lose sight of the fact that esterification must involve a tertiary amine, and thus, eliminate amidification as a possible reaction. If $R_1$ does contain an alcoholic hydroxyl and is reactive, and if the amine is the secondary amine, then in each instance the reaction must be conducted by use of suitable quantities of an alkylating agent so as to eliminate the amino hydrogen atom.

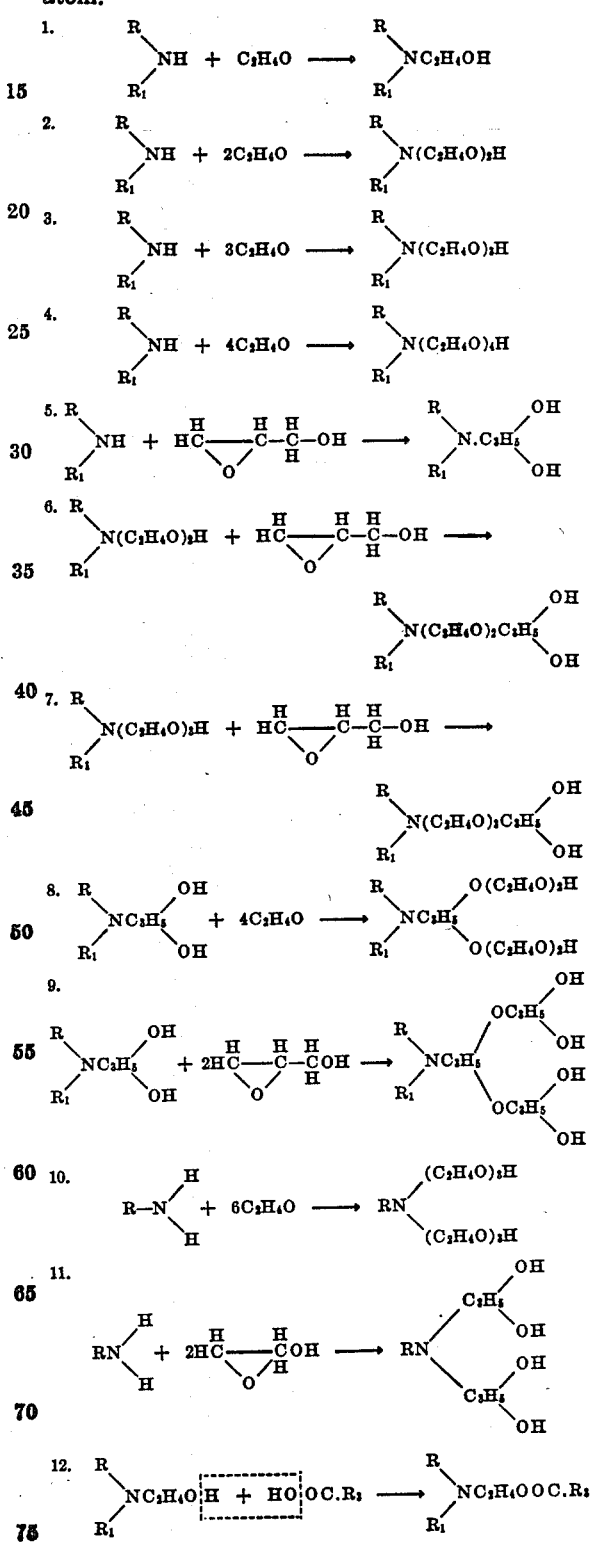

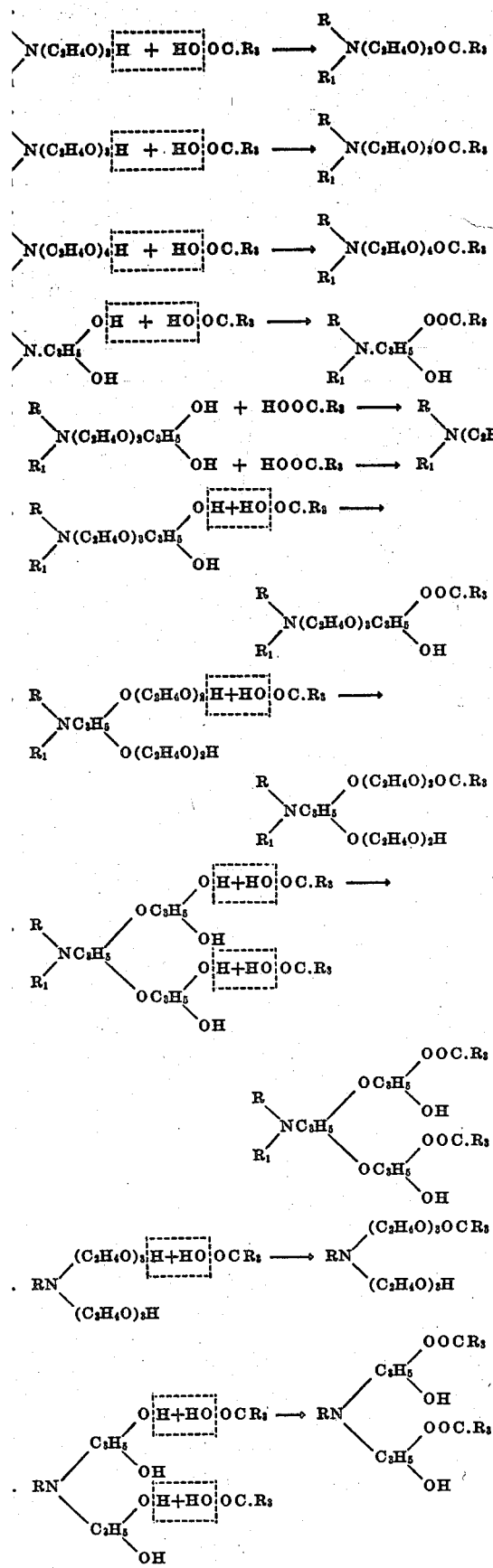

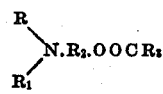

As will be noted, in such instances where utylene oxide replaces ethylene oxide, the number of carbon atoms in the polyglycol attached to the amino nitrogen atom may be as high as 15.

In certain of the above formulae, at first examination, there does not appear to be available hydroxyl to act as an alcoholic compound in subsequent esterification reactions. However, it has been pointed out that the radical $R_3$ may contain an alcoholic hydroxyl radical, as in the case of lactic acid or hydroxyacetic acid, and similarly, one occurrence of R in such instances where there are two occurrences of R joined to an amino-nitrogen atom, may represent a hydroxyalkyl or polyhydroxyalkyl radical, including the two in which the carbon atom chain is interrupted by oxygen. This is illustrated by reference to the first four reactions by merely replacing the secondary amine $(R)_2NH$ by the primary amine $RN(H)_2$ by using an appropriate amount of oxyethylating agent, to convert such primary amine into a secondary amine.

Summarizing what has been said thus far, it is to be noted that, in essence, it represents nothing more nor less than a description of a basic aminoalcohol of the formula:

$$\begin{array}{c} R \\ \diagdown \\ N.R_2.OOCR_3 \\ \diagup \\ R_1 \end{array}$$

in which R is a monovalent radical free from ether linkages and having at least 8 carbon atoms and not more than 32 carbon atoms and being a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages, and being a member of the class consisting of alkylene radicals, hydroxyalkylene radicals, alkyleneoxy radicals, hydroxyalkyleneoxy radicals, polyglycol and hydroxy polyglycol radicals in which any alkylene radicals present are selected from the group consisting of ethylene, propylene, butylene, and methylbutylene; and $R_1$ is a monovalent radical, and a member of the class consisting of aliphatic hydrocarbon radicals, alicyclic hydrocarbon radicals, and aralkyl hydrocarbon radicals having not more than 32 carbon atoms, and the monovalent radical $HOR_2$, wherein $R_2$ has its prior significance; $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

Previous reference has been made to the use of a polycarboxy reactant. Thus, combination can readily take place with typical polybasic carboxy acids, such as phthalic acid, succinic acid, malic acid, fumaric acid, citric acid, maleic acid, adipic acid, tartaric acid, glutaric acid, diphenic acid, naphthalic acid, tricarballylic acid, etc. Instead of acids one may, of course, use any functional equivalent, particularly the anhydride. The anhydride, when available, is a particularly suitable reactant when two carboxyl reactants are attached to adjacent carbon atoms. The most suitable acids are maleic, citraconic and phthalic. They are conveniently used in the form of the anhydride. Acids having three or more carboxyl radicals may be used, but we prefer to use the dibasic carboxy acids. Hydroxylated polycarboxy acids may be employed, but we prefer to use the non-hydroxylated type, insofar that they are, generally speaking, more resistant to pyrolysis.

Another type of polybasic carboxy acid which may be employed, is the so-called adduct type. For instance, maleic anhydride, or its equivalent, is reacted with a number of well-known types of reactants which contain conjugated double bonds and enter into the diene synthesis. The Diels-Alder adducts thus obtained represent suitable polybasic carboxy acids.

The somewhat similar adduct, in the sense that it involves the use of maleic anhydride, or its equivalent, is the Clocker adduct. This is obtained from unsaturated acids, alcohols, or the like, which may have only one ethylene linkage, or is not conjugated in the event that more than one ethylene linkage is present. The adduct is obtained at a distinctly higher temperature than the Diels-Alder adduct, and appears to be acyclic. Cyclobutane structures may also be involved. In the event that either type of adduct is obtained from a detergent-forming monocarboxy acid, particularly a higher fatty acid, such as the fatty acids derived from China-wood oil or linseed oil, the product so obtained is not considered as a detergent-forming acid derivative or a higher fatty acid derivative in the present instance.

It has been previously pointed out that the acylated amino-alcohols employed as reactants must have present a reactive alcoholic hydroxyl radical and may have present more than one such hydroxyl radical, and two, three, or even more. In the light of this fact, it is obvious that one may produce monomeric compounds comparable to dibutyl phthalate or linear polymers, free from cross-linking as obtainable from ethylene glycol and phthalic anhydride, or else, compounds in which cross-linking can take place to a greater or lesser degree, comparable to those obtainable from glycerol and phthalic anhydride. In any event, the final products obtained by esterification, must represent monomeric compounds, or else polymeric compounds comparable to an "A" stage, or "B" stage resin, i. e., either they must still be fusible or soluble in selected solvents, or both. They must not represent the insoluble, infusible "C" stage resins.

Esterifications of this type are used so generally that further description appears unnecessary. The alcoholic reactant, i. e., the amino-glycol, is usually a fairly viscous or semi-solid material per se. Reaction with polybasic carboxy acids produces substances which may be viscous liquids, balsams, or hard solids, but in any event, they are sub-resinous in the sense that they have not reached what is commonly termed the "C" stage.

Esterification reactions, of course, are conducted in such a manner that an active carboxyl group, or its equivalent, is present and also an available active hydroxyl group. The reactions may be, and frequently are, catalyzed by the addition of a small amount of free acid, such as dry hydrochloric acid, a few percent or less of an aromatic sulfonic acid, such as paratoluene sulfonic acid. The temperature employed is above the boiling point of water, for instance, 160° to 180° C., or even higher, provided there is no pyrolysis. The reaction goes to completion by virtue of the fact that water of esterification, or its equivalent, is removed. Such water may be removed in any suitable manner, such as the passage of dry nitrogen gas, or by use of an inert solvent, such as xylene or decalin. The progress of the reaction can be checked by determination of the amount of free acid present. Such esterification procedure or other esterification procedure which is readily available for use in the instant case, is described in numerous patents, including the following: U. S. Patent Nos. 1,618,209, 1,663,183, 1,678,105, 1,813,838, 1,815,886, 1,848,155, 1,886,242, 1,890,668, 1,900,693, 1,902,477, 1,904,595, 1,909,196, 1,909,197, 1,921,756, 1,933,697, 1,938,791, 1,993,026, 2,006,555, 2,027,351, 2,027,467, 2,028,914, 2,033,290, 2,035,314, 2,035,346, 2,118,926, 2,166,934, 2,195,362, 2,270,889, 2,284,127, 2,305,083, 2,306,095, 2,323,706.

The following are examples of new products contemplated by our invention:

COMPOSITION OF MATTER

*Example 1*

1 pound of the material exemplified by "Hydroxylated monocarboxy ester of high molal amino-polyglycol, Example 1," preceding, is esterified with 1 pound mole of phthalic anhydride. The reaction is conducted at approximately 165–195° C. until analysis shows that 1 carboxyl has been eliminated by esterification. A thick, amber-colored mass, substantially viscous or somewhat solid in nature, is obtained. In any event, esterification may be carried a little farther, or perhaps, not quite so far, but in any event, the final sub-resinous mass must represent an "A" or "B" stage resin, as differentiated from the insoluble and infusible "C" stage resin.

COMPOSITION OF MATTER

*Example 2*

The same procedure is employed as in the preceding examples, except that materials of the kind exemplified by "Hydroxylated monocarboxy ester of high molal amino-polyglycol, Examples 2 to 5, inclusive," are substituted for "Hydroxylated monocarboxy ester of high molal amino-polyglycol, Example 1" in the preceding example.

COMPOSITION OF MATTER

*Example 3*

The same procedure is followed as in Example 1 and Example 2, immediately preceding, except that maleic anhydride, adipic acid, citraconic anhydride, succinic acid, or some other polybasic acid, particularly a dibasic acid, is substituted in the preceding examples. If the reaction involves the use of an acid instead of an anhydride, then such reaction can be conducted in presence of an inert solvent, such as xylene, decalin, etc., which removes the water in a slow but continuous manner.

COMPOSITION OF MATTER

*Example 4*

Preceding examples are repeated, except that polyhydroxylated reactants are used exclusively, and in each instance the polybasic acids are employed in such molar proportion that there is 1 mole of polybasic anhydride (or two moles of the acid) employed for each available hydroxyl-radical present in the hydroxylated amino-polyglycol. 1 mole of the amino-polyglycol is used. Complete reaction produces a compound with a plurality of unreacted carboxylic radicals.

COMPOSITION OF MATTER

Example 5

The same reactants are employed as in Composition of matter, Examples 1, 2 and 3, preceding, except that the molal ratio is so changed that the available carboxylic radicals are just sufficient to combine with the available hydroxyl radicals. For instance, if the hydroxylated amino-polyglycol contains 1 hydroxyl radical, then 2 moles of such product are reacted with one mole of such dibasic acid or anhydride. Reaction is continued until both carboxyl radicals of the dibasic acid are eliminated.

COMPOSITION OF MATTER

Example 6

Compositions of matter exemplified by Examples 1, 2 and 3, preceding, are reacted with glycerol under substantially the same esterification conditions as previously described. The amount of glycerol added may vary from an equimolar ratio to a ratio where there is one mole of glycerol added for each residual carboxyl radical present. Such products are particularly apt to give highly viscous or amorphous materials. When prepared in iron apparatus, the products are invariably of a deep red or amber color.

In order to illustrate derivatives obtained by reaction between a polybasic carboxy acid, and more especially, a dibasic carboxy acid and an esterified amino-alcohol of the kind described, the following formulae, along with indicated reactions, are included. Previous reference has been made to $R_3.COOH$ being a low molal monocarboxy acid. In some instances such acid might contain an alcoholic hydroxyl group, as in the case of lactic acid, hydroxyacetic acid, etc. For convenience, in the formulae appearing immediately hereafter $OHR'_3.COOH$ is intended to refer specifically to the low molal monocarboxy acid having an alcoholic hydroxyl radical. $R_4(COOH)_n$ represents the polybasic acid in which $n$ represents a small whole number such as 2 or 3. For convenience, the formulae are limited to the dicarboxy type, $HOOC.R_4.COOH$. The formulae are based on reactions involving equimolar quantities, except in the last two instances, where two moles of the dicarboxy acid are used for each mole of dihydric aminoalcohol. In examining the structural formulae immediately following, attention is directed as to what has been said previously in regard to the esterification of the amino-alcoholic body with a monocarboxy acid when $R_1$ did contain a hydroxyl radical. An analogous situation applies in the instant case where the hydroxylated monocarboxy acid ester is subjected to reaction of a polycarboxy acid or derivative. It appears unnecessary to repeat what has been said, except to point out that isomers or more complex structures may be involved when $R_1$ contains one or more alcoholic hydroxyl radicals.

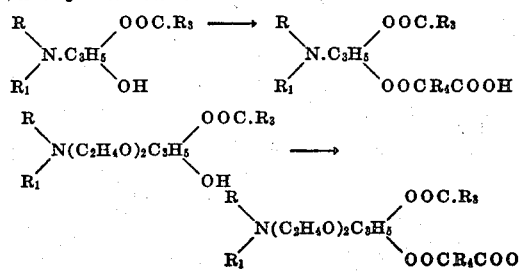

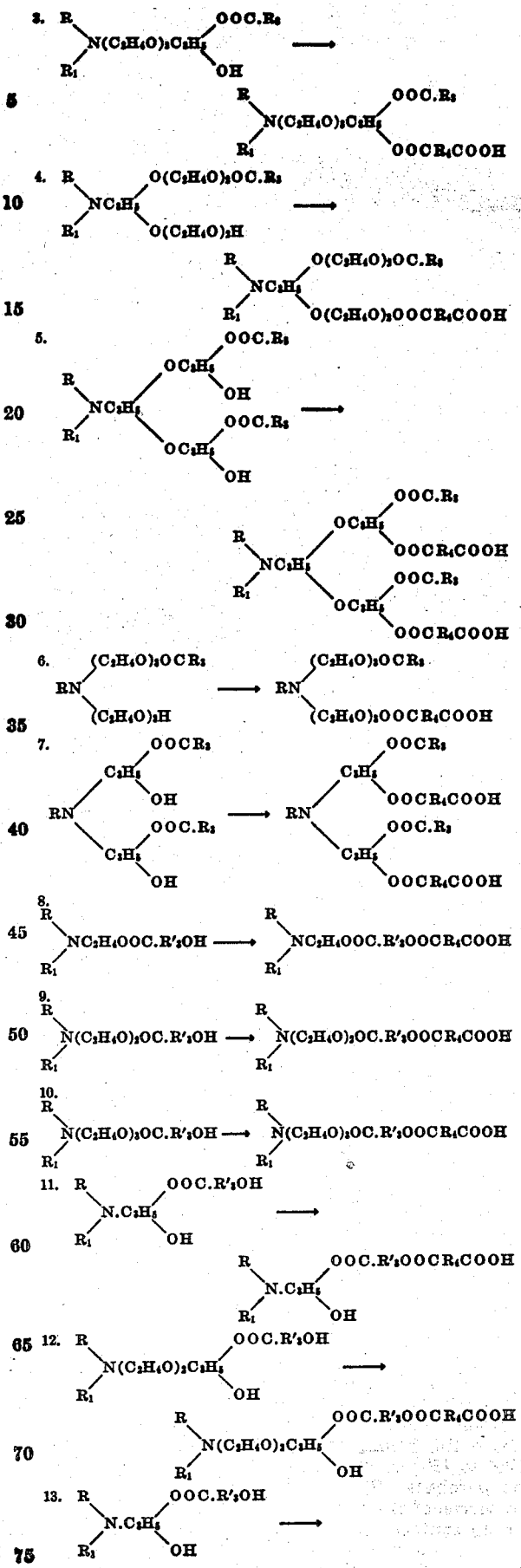

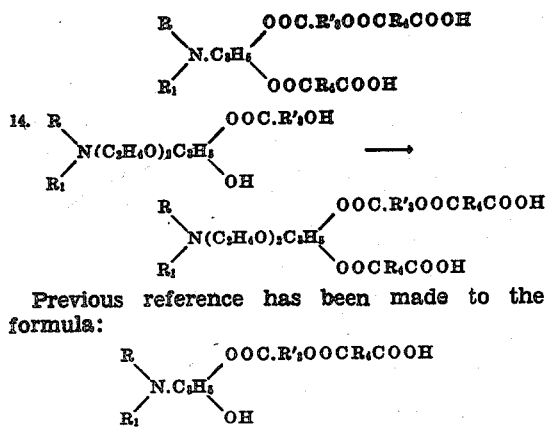

Previous reference has been made to the formula:

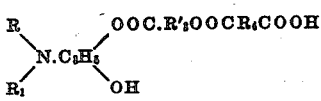

Examination reveals that reaction may have involved the other available hydroxyl radical, thus resulting in a compound of the following formula:

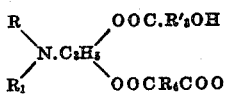

This also is true in regard to the following compound previously depicted and its isomer.

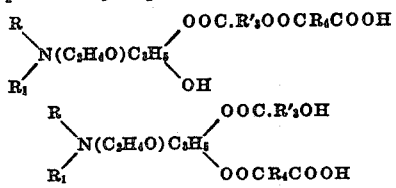

Any of the previous compounds illustrate hydroxy acids which may undergo condensation polymerization, and thus form compounds of increased molecular weight. Compare with the formation of linoleate polymers, for example, from ethyleneglycol monoacid phthalate. Trihydric alcoholic structure or the use of a tribasic acid would lead to cross linking.

In any event, the formation of the polymers may be indicated as a derivative of the prior compound of the formula:

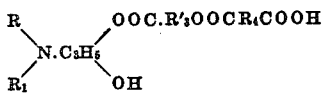

in the following manner:

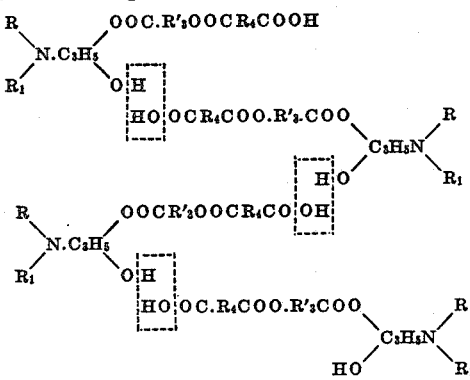

In the above presentation re-esterification has been ignored.

The hydroxylated amino-glycol of the kind previously described, must contain at least one, and preferably more than one, alcoholic hydroxyl radical. Such reactant may be considered for the sake of simplicity as being in the class of an alcohol, i. e., a monohydric or polyhydric alcohol. If an alcohol is indicated by the formula $$Y'(OH)_n$$

where $n$ indicates the number one or more, and if a polybasic acid body be indicated by the formula $X'(COOH)_n$, where $n$ indicates the number two or more, then the reaction between a monohydric alcohol and a polybasic acid will result in a compound which may be indicated by the following formula: $YX(COOH)_{n'}$, where $n'$ indicates the number one or more, and which is in reality a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed phthalic anhydride, then examination reveals that the formulae might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals, or there might be both. This is indicated by the following:

$$(YX)_q(OH)_{n'}$$
$$(YX)_q(COOH)_{m'}$$
$$(OH)_{n''}(YX)_q(COOH)_{m''}$$

in which $q$ indicates a small whole number (one in the case of a monomer, and probably not over 20, and usually less than 10), and $m'$ and $n'$ indicate the number one or more, and $m''$ and $n''$ indicate zero or a small or moderately-sized whole number, such as zero, one or more, but in any event, probably a number not in excess of 40. Naturally, each residual hydroxyl could combine with phthalic acid or its equivalent, or with a tribasic acid, such as citric acid; and in such event, there would be a large number of free or uncombined carboxyl radicals present, possibly 1 to 20, or more. Actually, the preferable type of reagent would be more apt to include less than 10, and in fact, less than 5 free hydroxyl radicals. It is not necessary to remark that the residual carboxyl radicals can be neutralized in any suitable manner, such as conversion into salts, esters, amides, amino esters, or any other suitable form. Usually such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexylamine, benzylamine, aniline, toluidine, etc. Conversion into the ester would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like. One could employ an amino-alcohol so as to produce an ester.

If a tricarboxy acid, such as citric acid, is employed, then at least theoretically, two moles of the hydroxylated, esterified amino-glycol derivative might react with one mole of the citric acid compound. Similarly, as has already been pointed out, a large number of molecules of a polybasic acid compound might combine with a single molecule of a highly hydroxylated esterified aminoglycol. For practical purposes, howver, we have found that the most desirable products are obtained by combinations, in which the ratio of amino-alcohol derivative to the polybasic acid, is within the ratio of 3 to 1 and 1 to 5, and in which the molecular weight of the resultant product does not exceed 10,000, and is usually less than 5,000, or preferably, less than 3,000. This is particularly true, if the resultant product is soluble to a fairly definite extent, for instance, at least 5%, in some solvent, such as water, alcohol, benzene, dichlorethyl ether, acetone, cresylic acid, or the like. This is simply another way of stating that it is preferable, if the product be one of the sub-resins, which are commonly referred to as an A resin, or a B resin, as distinguished from a C resin, which is a highly infusible, insoluble resin (see Ellis, Chemistry of Synthetic Resins, 1935, page 862 et seq.).

In recapitulating what has been said previously, the sub-resinous, semi-resinous, or resinous product herein contemplated may be indicated by the following formula:

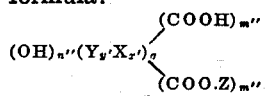

in which the characters have their previous significance, and $y'$ represents a small whole number not greater than 3, and $x'$ represents a small whole number not greater than 5; Z represents a hydrogen ion equivalent, such as a metallic atom, organic radical, etc.

Reference to an amine and amino compound is intended to include the salts and the anhydro base, as well as the hydrated base, since both obviously are present when a water-containing emulsion is treated with an amine or amino compound.

"In an aqueous solution of the amine the anhydro base, R—NH₂, the hydrated base, R—NH₃OH, and the two ions are all present." Richter, v. s. page 252).

In the hereto appended claims reference to radicals derived from olefine oxides, is intended to include glycid. In other words, in the case of propylene oxide, it is intended that hydroxypropylene oxide be included.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for resolving petroleum emulsions, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent employed in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available In practising our process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent. The above procedure may be used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

Reference is made to our co-pending applications Serial Nos. 542,233, 542,235, 542,236, 542,237 and 542,238 filed June 26, 1944.

Since the herein described products are esters, it is hardly necessary to point out that saponification decomposes the product into its original components, to wit, an amine and an acid or acids. Actually, the acids are obtained in the form of salts, usually the sodium or potassium salts. Such conversion into the original components or simple modifications thereof results in products which can be examined in the customary manner, and thus serve to identify the esterified amino alcohol.

Having thus described our invention, what we claim as new and desire to secure by Letters Patent is:

1. A process for resolving petroleum emulsions of the water-in-oil type, characterized by subjecting the emulsion to the action of a demulsifier, comprising a sub-resinous esterification product of the formula:

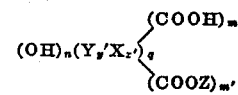

in which X is a polycarboxy acid radical selected from the class consisting of polycarboxy acids, anhydrides, monohydric alcohol esters and polyhydric alcohol esters, with the proviso that the alcohol radical of said esters be free from detergent-forming monocarboxy acid radicals, and $y'$ represents a whole number not greater than 3, and $x'$ represents a whole number not greater than 5, and $n$, $m$ and $m'$ indicate whole numbers from 0 to 40; $q$ indicates a whole number from 1 to 20; Z is a hydrogen ion equivalent; Y is the radical of a basic esterified amino-alcohol of the formula:

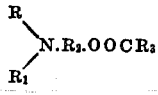

in which R is a monovalent radical free from ether linkages and having at least 8 carbon atoms and not more than 32 carbon atoms and being a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals in which any alkylene radicals present are selected from the group consisting of ethylene, propylene, butylene, and methylpropylene; and $R_1$ is a monovalent radical and a member of the class consisting of aliphatic hydrocarbon radicals, alicyclic hydrocarbon radicals and aralkyl hydrocarbon radicals having not more than 32 carbon atoms and the radical $HOR_2$, wherein $R_2$ has its prior significance; $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

2. The process of claim 1, wherein the polybasic acid radicals are limited to the dicarboxy species.

3. The process of claim 1, wherein the polybasic acid radicals are limited to the dicarboxy species, and in which there is at least one alcoholic hydroxyl radical present as part of the radical $R_1$.

4. The process of claim 1, wherein the polybasic carboxy acid is phthalic acid and in which there is at least one alcoholic hydroxyl radical present as part of the radical $R_1$.

5. The process of claim 1, wherein the polybasic carboxy acid is maleic acid and in which there is at least one alcoholic hydroxyl radical present as part of the radical $R_1$.

6. The process of claim 1, wherein the polybasic carboxy acid is citraconic acid and in which there is at least one alcoholic hydroxyl radical present as part of the radical $R_1$.

MELVIN DE GROOTE.
BERNHARD KEISER.